United States Patent
Park et al.

(10) Patent No.: US 7,296,509 B2
(45) Date of Patent: *Nov. 20, 2007

(54) BREAD MAKER

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 320 days.

This patent is subject to a terminal disclaimer.

(21) Appl. No.: 10/811,890

(22) Filed: Mar. 30, 2004

(65) Prior Publication Data

US 2004/0221742 A1 Nov. 11, 2004

(30) Foreign Application Priority Data

May 7, 2003 (KR) .................. 10-2003-0029105

(51) Int. Cl.
*A47J 37/01* (2006.01)
*A23L 1/00* (2006.01)

(52) U.S. Cl. .................. 99/348; 99/326; 99/329 R; 99/331; 99/334

(58) Field of Classification Search .................. 99/348, 99/326, 329 R, 331, 334, 335, 353; 126/198, 126/192, 197, 190, 273 R, 275 R
See application file for complete search history.

(56) References Cited

U.S. PATENT DOCUMENTS

| 4,803,086 | A | | 2/1989 | Hedenberg |
| 5,117,079 | A | * | 5/1992 | Morino et al. ............... 219/726 |
| 6,029,563 | A | * | 2/2000 | Nakagawa et al. ........... 99/327 |
| 6,729,227 | B2 | * | 5/2004 | Lee et al. ...................... 99/348 |

FOREIGN PATENT DOCUMENTS

| EP | 1 402 804 A1 | 3/2004 |
| JP | 5-184762 | 7/1993 |
| JP | 2000-093320 | 4/2000 |
| KR | 1988-14429 | 12/1988 |
| WO | WO 99/25467 | 5/1999 |

* cited by examiner

Primary Examiner—Reginald L. Alexander
(74) Attorney, Agent, or Firm—Staas & Halsey LLP

(57) ABSTRACT

The present invention relates to a bread maker. The bread maker comprises: a main body having a door opening and forming a bread making space; a door opening/closing the door opening; a baking tray in the bread making space; a tray sensor sensing whether the baking tray is mounted in the bread making space; and a controller controlling a bread making process to be performed on the basis of a sensing signal from the tray sensor when the baking tray is mounted in the bread making space. Thus, operational errors are prevented since the bread maker is operates only when a baking tray is mounted.

19 Claims, 4 Drawing Sheets

BREAD MAKER

CROSS-REFERENCE TO RELATED APPLICATIONS

This application claims the benefit of Korean Application No. 2003-29105, filed May 7, 2003, in the Korean Intellectual Property Office, the disclosure of which is incorporated herein by reference.

BACKGROUND OF THE INVENTION

1. Field of the Invention

The present invention relates to a bread maker, and more particularly to a bread maker operating with a baking tray mounted therein.

2. Description of the Related Art

Conventional bread makers have a main body, forming a bread making space and a door opening with a door. The bread makers also have baking trays in the bread making space. When a mixing bag, filled with raw materials for bread, is inserted into the bread maker and the bread maker is operated, raw materials are kneaded and then poured into the baking tray. The leavening and baking processes then commence.

According to a conventional bread maker, even if a user operates the bread maker without placing the baking tray in the bread making space, the bread making processes, such as the leavening and kneading processes, are automatically performed. Performing the bread making process without the baking tray in place causes the raw materials to be dispersed into the bread making space during the leavening and baking processes. As a result, desiring bread cannot be made and the bread making space can be contaminated.

SUMMARY OF THE INVENTION

It is an aspect of the present invention to provide a bread maker that will not perform a bread making process unless a baking tray is mounted therein.

Additional aspects and/or advantages of the invention will be set forth in part in the description that follows, and, in part, will be obvious from the description, or may be learned by practice of the invention.

To achieve the above and/or other aspects according to the present invention, a bread maker is provided. The bread maker comprises: a main body, having an opening and forming a bread making space; a door capable of opening and closing the opening; a baking tray removably mounted in the bread making space; a tray sensor, sensing whether the baking tray is mounted in the bread making space; and a controller, controlling a bread making process to be performed on the basis of a sensing signal from the tray sensor when the baking tray is mounted in the bread making space.

In an aspect of the present invention, the tray sensor comprises a sensing member in the door. When the door is closed and a baking tray is mounted, the sensing member makes contact with the baking tray. A sensing switch then generates a sensing signal.

In another aspect of the invention, the tray sensor comprises a sensing member in the baking tray. When the door is closed and a baking tray is mounted, the sensing member makes contact with the door. A sensing switch then generates a sensing signal.

In another aspect of the present invention, the tray sensor comprises: a sensing member supported by an internal panel of the door. The sensing member passes through the internal panel and extends into the bread making space, where it makes contact with the baking tray. An operation lever, which is interposed between the internal and external panels of the door, is supported by a central pivot. One example of an operational lever is a shaft that performs a seesaw movement. When the baking tray is mounted in the bread making space, the tray pushes against the sensing member. As the sensing member is pushed into the bread maker, the sensing member pushes against the operational lever, forcing the operational lever to pivot. When the operation lever pivots, the opposite end of the operational lever makes contact with a sensing switch. When the contact is made, a signal is generated.

In a further aspect of the present invention the bread maker has a tray sensor that comprises a sensing member, a sensing switch, and a pivot arm, mounted on a pivot. In this aspect, the sensing member extends into the bread making space so that when the baking tray is mounted in the bread making space the sensing member is driven out. The sensing member is attached to the first end of the pivot arm such that when the sensing arm is driven from the bread making area the pivot arm pivots and the second end of the pivot arm makes contact with the sensing switch. When the pivot arm makes contact, the tray sensor transmits a signal to the controller, allowing it to control the bread making processes accordingly.

In another aspect, the bread maker further comprises a door sensor to sense whether the door is closed. The controller allows the bread making process to be performed only when the door is closed.

Another aspect of the present invention involves mounting a display on the bread maker that utilizes the signals from the tray sensor and/or the door sensor. Depending on the signals, the display can indicated when the tray is in place or missing, and/or when the door is open or closed.

BRIEF DESCRIPTION OF THE DRAWINGS

These and/or other aspects and advantages of the invention will become apparent and more readily appreciated from the following description of the embodiments, taken in conjunction with the accompany drawings, of which.

DETAILED DESCRIPTION OF THE PREFERRED EMBODIMENTS

Figure 1:
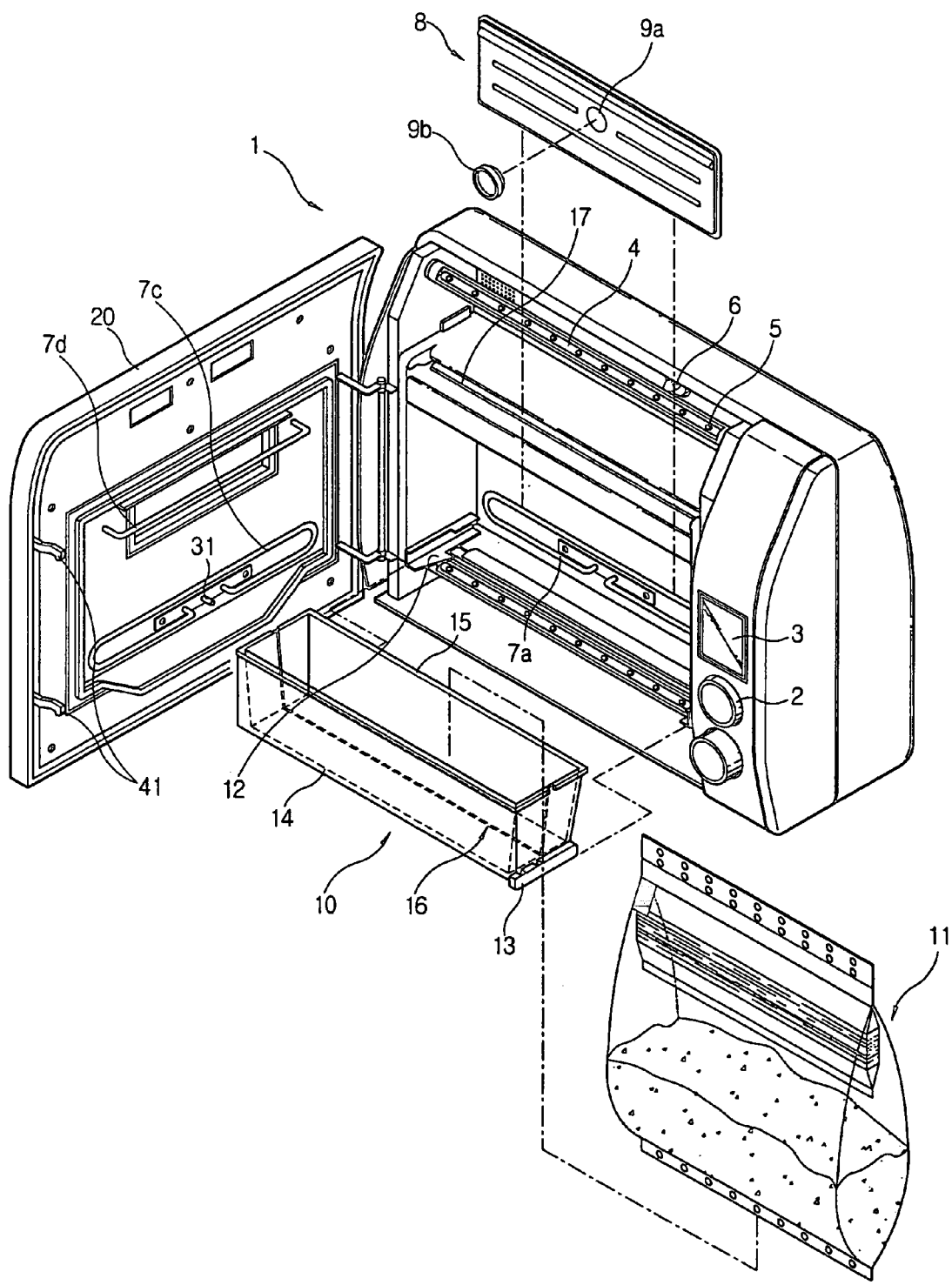
FIG. 1 is a perspective view of a bread maker according to one embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

As shown in FIG. 1, a bread maker according to an embodiment of the present invention comprises a main body 1 having a bread making space and a door opening, a baking tray 10 in the bread making space, and a door 20 opening/closing the door opening. An adjusting knob 2, to adjust operation of the bread maker, and a display 3, to display the operational state of the bread maker, are located on one side of the front of the main body.

In the bread making space are a pair of kneading drums 4 which are spaced apart and parallel to each other. The kneading drums 4 have holders 5, respectively, to hold opposite ends of a mixing bag 11 filled with raw materials for bread. A bar code reader 6, which reads a bar code attached to the mixing bag 11, is attached to the holders 5 of the kneading drums 4. The bar code reader 6 projects forward from the rear wall of the bread making space and is adjacent to the upper kneading drum of the pair of kneading drums 4. As the mixing bag 11 is wound on the kneading drums 4, the bar code reader 6 shown in FIG. 1 reads the bar code of the mixing bag 11. The bar code reader 6 may read the bar code sequentially from a starting point of the bar code.

Heaters in the upper and lower parts of the rear wall of the bread making space, and upper and lower parts of the inside of the door 20 heat the interior of the bread making space. Hereinafter, the heaters in the lower and upper parts of the bread making space are respectively referred to as a first heater 7a and a second heater (not shown). The heaters provided in lower and upper parts of the door 20 are respectively referred to as a third heater 7c and a fourth heater 7d. The first through fourth heaters 7a, 7c and 7d are manufactured with tubular members and are positioned along the width (a lateral direction) of the bread making space. At least the first heater 7a is manufactured such that the tubular members are formed in a loop and positioned parallel to the lower part of the rear wall of the bread making space. The bread maker 1 further comprises a vapor supplying reservoir 8 to supply vapor to the raw materials during the leavening and baking processes. During these processes, the kneaded raw materials are heated, and a heat transmitting member transmits heat from the first heater 7a to the vapor supplying reservoir 8.

The vapor supplying reservoir 8 is shaped like a closed box. In the upper part of the vapor supplying reservoir 8 is a nozzle to spray vapor along a lengthwise direction thereof. In an upper part of the vapor supplying reservoir 8 are a water injector 9a and a stopper 9b to open/close the water injector 9a.

A component compartment (not shown) is formed with a first component compartment (not shown) formed in one side of the bread making space, and a second component compartment (not shown) formed in the rear part of the bread making space. In the first compartment (not shown) are a driving motor (not shown), rotating clockwise and counterclockwise, at least one of the upper and lower kneading drums 4, and components, such as a belt (not shown) linking the upper and lower kneading drums so that they rotate together. In the second component compartment (not shown) are an exhaust fan (not shown), to exhaust smells generated in the bread making compartment, and a temperature sensor (not shown), to sense the temperature in the bread making space.

The baking tray 10 is shaped like a box with an open top. The baking tray 10 has supporting ribs 13 on opposite lower ends which are slidably attached to, and detachable from the supporting rails 12 on opposite inside walls of the bread making space. Also, the baking tray 10 has a first half 14 and a second half 15, which can be separated from each other along their length. In the bottom of the baking tray 10 there is a slit 16 formed between the first and second halves 14 and 15. A lower part of the mixing bag 11 passes down through the slit 16.

Opposite ends of the mixing bag are attached to the holders 5 of the kneading drums 4. The kneading drums 4 are then rotated by manipulating a rotation knob 2 when the door 20 is open. When one end of the mixing bag 11 is wound on the kneading drums 4 by rotating kneading drums 4, the bar code makes contact with a bar code sensor of the bar code reader 6. The bar code reader 6 then transmits a bread making program, read from the bar code, to the bread maker.

When the door 20 is closed, the pair of the kneading drums 4 rotate clockwise and counterclockwise according to the bread making program read from the bar code, thereby kneading the raw materials contained in the mixing bag 11. The bar code reader 6 is spaced away from the kneading drums 4, so that interference with the rotating kneading drums 4 can be avoided.

When in the bread making space the upper end of the mixing bag 11 passes through a pair of kneading members 17 and is wound on the upper kneading drum 4. The lower end passes through the slit 16 formed in the bottom of the baking tray 10 and is wound on the lower kneading drum 4. The mixing bag 11 filled with the raw materials is repeatedly moved up and down by the rotation of the pair of kneading drums 4, so that the raw materials are kneaded between the kneading member 17 and the baking tray 10. After the kneading process is completed, the lower kneading drum 4 is rotated so that the mixing bag 11 is wound around the lower kneading drum 4, and is detached from the upper kneading drum 4. The mixing bag 11 then passes through the kneading member 17 and finally passes through the slit 16 of the baking tray 10. When the mixing bag 11 passes through the slit 16 of the baking tray 10, the raw materials in the mixing bag 11 do not and are instead poured onto the baking tray 10. The mixing bag 11 passes through the slit 16 of the baking tray 10 and is wound on the lower kneading drum.

After the raw materials filled in the mixing bag 11 are completely kneaded, the raw materials are leavened and baked in the baking tray 10. During the leavening and baking processes, vapor is supplied from the vapor supplying reservoir 8 to the baking tray 10.

When the heaters generate heat in the leavening and baking process, heat generated from the first heater 7a is transmitted to the vapor supplying reservoir 8, thereby vaporizing water contained in the vapor supplying reservoir 8. The vapor then moves to an upper side of an interior of the vapor supplying reservoir 8, and is sprayed on the raw materials in the baking tray 10 through the nozzle by a pressure difference between the interior and exterior of the vapor supplying reservoir 8.

Thus, cracking of the bread surface, which may be caused by a moisture shortage, is prevented and the bread surface becomes glazed. Also, when the vapor moves to an upper side of an interior of the vapor supplying reservoir 8 and is sprayed on the raw materials, water is still left in the vapor supplying reservoir 8. Thus, water does not flow out through the nozzle part. Accordingly, the completed bread is not excessively moist.

Figure 2:
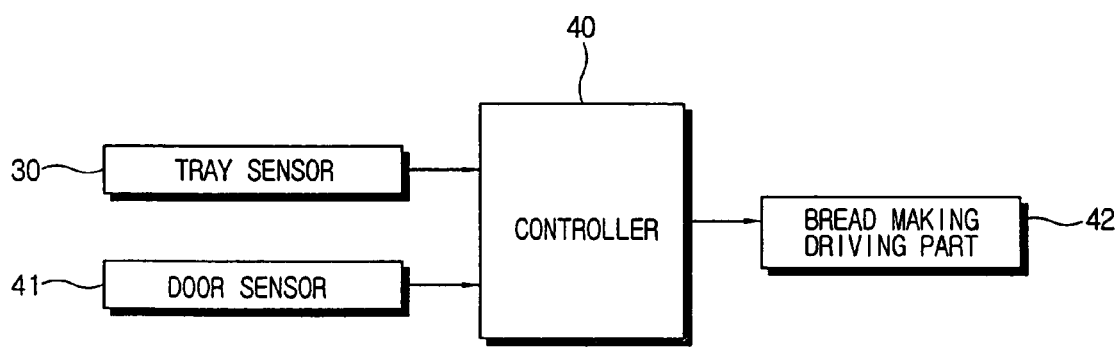
FIG. 2 is a control block diagram of the bread maker in FIG. 1.

FIG. 2 is a control block diagram of the bread maker 1 according to an embodiment of the present invention.

The controller 40 receives sensing signals from a door sensor 41, sensing whether the door is closed or opened, and the tray sensor 30, sensing whether the baking tray 10 is mounted or not. The controller controls a bread making driver 42 to drive a kneading drum driving motor (not shown), the heaters 7a, 7c and 7d. The controller 40 can output a control signal so that the bread making driver 42 operates only when the controller 40 simultaneously receives the sensing signals from the tray sensor 30 and the door sensor 41.

Figure 3:
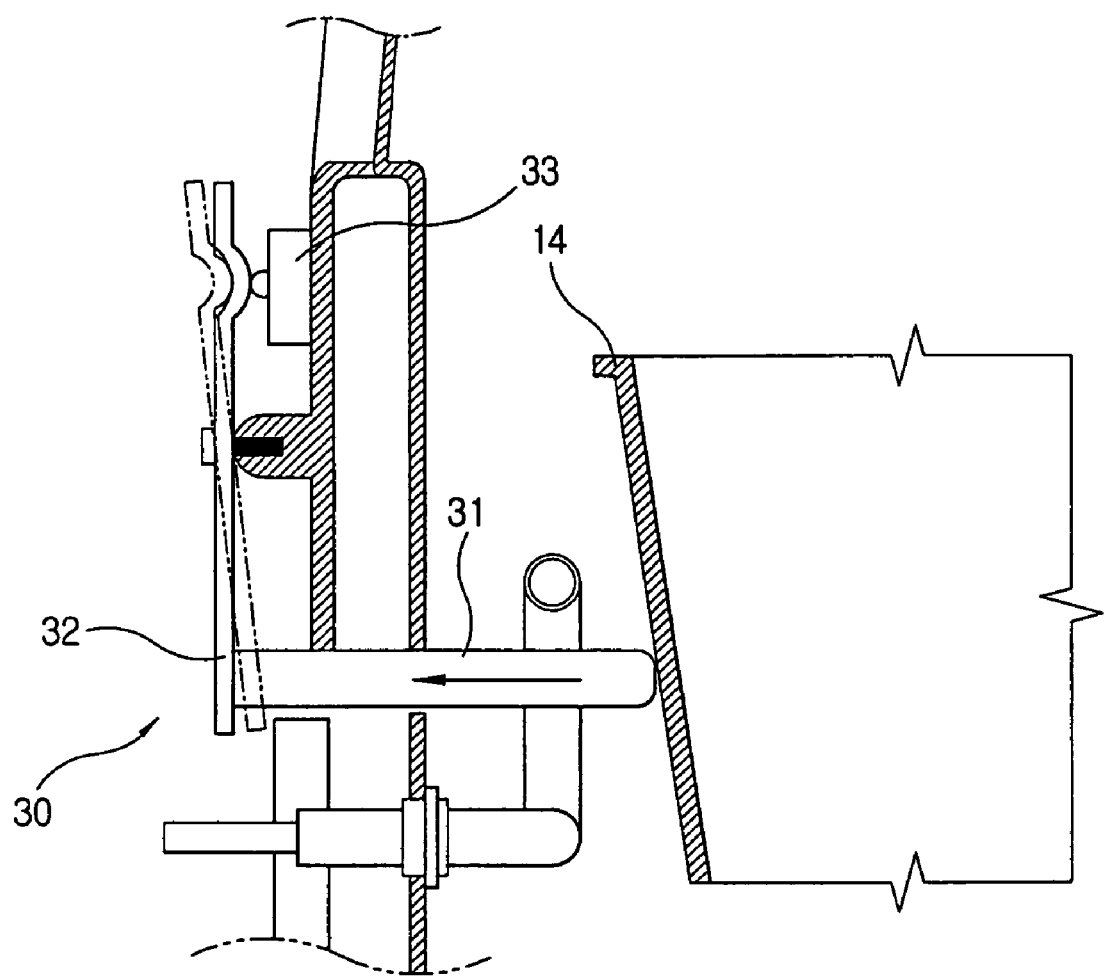
FIG. 3 is an enlarged sectional view of a tray sensor 30 of the bread maker in FIG. 1.

FIG. 3 is an enlarged sectional view of the tray sensor 30 of the bread maker 1.

As shown in FIG. 3, the tray sensor 30 comprises a sensing member 31, an operation lever 32, and a sensing switch 33.

The sensing member 31 is slidably supported by an internal panel of the door 20, passes through the internal panel, and is extended toward the bread making space to contact the baking tray 10.

The operation lever 32 is interposed between the internal and external panel of the door 20, and has a central pivot. The operation lever 32 elastically pushes the sensing member 31 toward the bread making space.

The sensing switch 33 is turned on/off by the seesaw movement of the operation lever 32.

Figure 4:
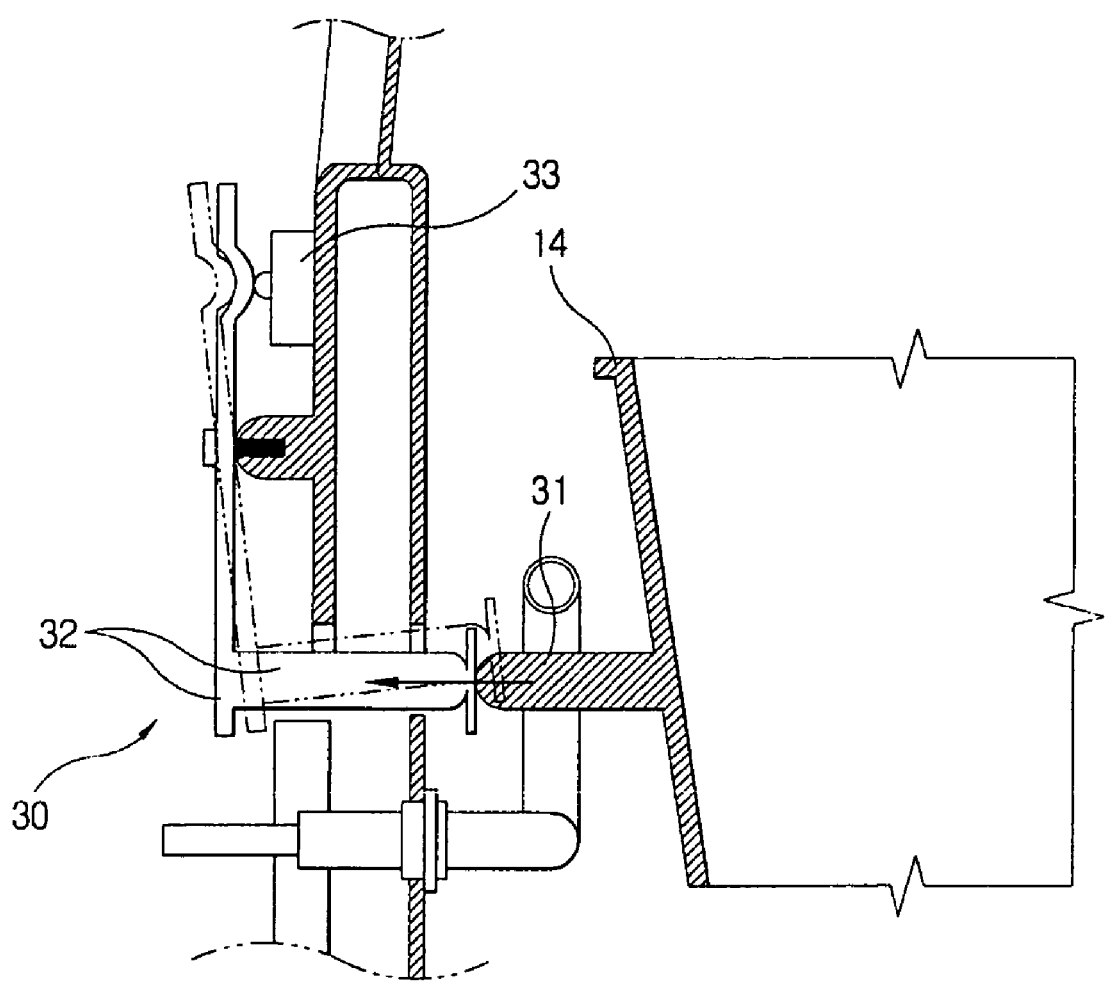
FIG. 4 illustrates a bread maker according to another embodiment of the present invention.

If a user mounts the baking tray 10 and closes the door 20 when a mixing bag 11 is inserted, the sensing member 31 of the tray sensor 30 contacts the first half 14 of the baking tray 10 and is pushed away from the tray 10. Due to the movement of the sensing member 31, the operation lever 32 pivots, and the sensing switch 33 is pressed, thereby generating a sensing signal. Alternately, as shown in FIG. 4 the sensing member 31 may be provided in the baking tray 10 such that when the door 20 is closed and the baking tray 10 is mounted, the sensing member 31 makes contact with the door 20. The sensing switch 33 then generates a sensing signal.

In the above embodiment, the tray sensor 30 and the door sensor 41 are separate sensors. However, since the tray sensor 30 can confirm whether the baking tray 10 is mounted or not only when the door 20 is closed, whether the door 20 is closed and whether the baking tray 10 is mounted can be detected by only the tray sensor 30. Thus, the door sensor 41 can be omitted.

As described above, according to the present invention, a bread maker is operational only when a baking tray is mounted, thus preventing an operational error of the bread maker.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker, comprising:
    a main body having a door opening and forming a bread making space;
    a door to open and close the door opening;
    a baking tray removably mounted in the bread making space;
    a tray sensor, to sense whether the baking tray is mounted in the bread making space, the tray sensor comprising:
        a sensing member provided in the door that contacts the baking tray when the door is closed,
        an operation lever which elastically pushes the sensing member towards the bread making space, such that contact between the baking tray and the sensing member is dependent upon the closing of the door, and
        a sensing switch that generates a sensing signal when the sensing member contacts the baking tray; and
    a controller, to control a bread making process on the basis of a sensing signal from the tray sensor.

2. The bread maker according to claim 1, wherein the tray sensor comprises:
    the sensing member which is supported by an internal panel of the door, passes through the internal panel, and is projected toward the bread making space to contact with the baking tray;
    the operation lever which is interposed between the internal and external panel of the door, is supported by a central shaft of seesaw movement, elastically pushes the sensing member, and performs the seesaw movement as the sensing member moves frontward and backward; and
    a sensing switch turned on/off by the seesaw movement of the operation lever.

3. The bread maker according to claim 1, further comprising a door sensor sensing whether the door is closed or not, wherein the controller enables performance of the bread making process when the door is closed.

4. The bread maker of claim 1, wherein the sensing member makes contact with the baking tray when the baking tray is properly mounted in the bread making space.

5. The bread maker according to claim 1, wherein the tray sensor comprises a sensing member in the baking tray that generates the sensing signal when contact is made with the door.

6. The bread maker of claim 5, wherein the sensing member makes contact with the door when the baking tray is properly mounted in the bread making space.

7. The bread maker according to claim 1, wherein the tray sensor comprises:
    the operation lever which includes a pivot arm, with a first end and a second end, mounted on a pivot, wherein;
        the sensing member extends into the bread making space so that when the baking tray is mounted in the bread making space the sensing member is driven out,
        the sensing member is attached to the first end of the pivot arm such that when the sensing arm is driven from the bread making area the pivot arm pivots and the second end of the pivot arm makes contact with the sensing switch, and
        the tray sensor transmits a signal to the controller based on whether or not the sensing switch is in contact with the pivot arm.

8. The bread maker according to claim 1, further comprising a display to indicate if the baking tray is mounted in the bread making space, wherein the indication is based on the sensing signal from the tray sensor.

9. The bread maker according to claim 3, further comprising a display to indicate if the door is open or closed, wherein the indication is based on a sensing signal from the door sensor.

10. The bread maker of claim 7, wherein the sensing member makes contact with the baking tray when the baking tray is properly mounted in the bread making space.

11. A bread maker comprising:
a main body having a door opening and forming a bread making space;
a door to open and close the door opening;
a baking tray removably mounted in the bread making space;
a tray sensor, to sense whether the baking tray is mounted in the bread making space, the tray sensor comprising:
a sensing member provided in the baking tray that contacts the door when the door is closed,
an operation lever which elastically pushes and contacts with the sensing member such that contact between the sensing member in the baking tray and the operation lever is dependent upon the closing of the door, and
a sensing switch that generates a sensing signal when the sensing member contacts the door; and
a controller, to control a bread making process on the basis of a sensing signal from the tray sensor.

12. A bread maker, comprising:
a main body having a door opening and forming a bread making space;
a door to open and close the door opening;
a baking tray removably mounted in the bread making space;
a tray sensor provided in the door, to sense whether the baking tray is mounted in the bread making space by making contact with the baking tray when the door is closed and comprising an operation lever which elastically pushes the tray sensor towards the bread making space such that contact between the baking tray and the tray sensor is dependent upon the closing of the door;
a door sensor, to sense whether the door is open or closed; and
a controller, to control a bread making process on the basis of a sensing signal from the tray sensor and a sensing signal from the door sensor.

13. The bread maker according to claim 12, wherein the tray sensor comprises:
a sensing member;
the operation lever which includes a pivot arm, with a first end and a second end, mounted on a pivot; and
a sensing switch, wherein;
the sensing member extends into the bread making space so that when the baking tray is mounted in the bread making space the sensing member is driven out,
the sensing member is attached to the first end of the pivot arm such that when the sensing arm is driven from the bread making area the pivot arm pivots and the second end of the pivot arm makes contact with the sensing switch, and
the tray sensor transmits a signal to the controller based on whether or not the sensing switch is in contact with the pivot arm.

14. The bread maker according to claim 12, wherein the tray sensor comprises a sensing member in the door that generates the sensing signal when contact is made with the baking tray.

15. The bread maker according to claim 12, further comprising a display to indicate if the baking tray is mounted in the bread making space, wherein the indication is based on the sensing signal from the tray sensor.

16. The bread maker according to claim 15, wherein the display further indicates if the door is open or closed, wherein the indication is based on the sensing signal from the door sensor.

17. A bread maker, comprising:
a main body forming a bread making space;
a baking tray removably mounted in the bread making space; and
a tray sensor provided in a door of the bread maker, to sense whether the baking tray is mounted in the bread making space by making contact with the baking tray when the door is closed and comprising an operation lever which elastically pushes the tray sensor towards the bread making space such that contact between the baking tray and the tray sensor is dependent upon the closing of the door; and
a controller, to control a bread making process on the basis of a sensing signal from the tray sensor.

18. The bread maker according to claim 17, wherein the tray sensor comprises:
a sensing member;
the operation lever which includes a pivot arm, with a first end and a second end, mounted on a pivot; and
a sensing switch, wherein;
the sensing member extends into the bread making space so that when the baking tray is mounted in the bread making space the sensing member is driven out,
the sensing member is attached to the first end of the pivot arm such that when the sensing arm is driven from the bread making area the pivot arm pivots and the second end of the pivot arm makes contact with the sensing switch, and
the tray sensor transmits a signal to the controller based on whether or not the sensing switch is in contact with the pivot arm.

19. The bread maker according to claim 17, further comprising a display to indicate if the baking tray is mounted in the bread making space, wherein the indication is based on a sensing signal from the tray sensor.

* * * * *